United States Defensive Publication [19] (H) [11] T100,603

Lehr et al. [43] May 5, 1981

[54] BENEFICIATION OF HIGH CARBONATE PHOSPHATE ORES

[76] Inventors: James R. Lehr, 124 Riverview Dr.; Shuang-Shii Hsieh, 1622 Bridlewood Dr., both of Florence, Ala. 35630

[21] Appl. No.: 146,579

[22] Filed: May 5, 1980

[51] Int. Cl.[3] ..... B03D 1/06

[52] U.S. Cl. ..... 209/167

[57] ABSTRACT

A phosphate ore beneficiation process to remove undesirable carbonate mineral components by flotation by subjecting a deslimed phosphate ore flotation feed containing the carbonate mineral impurities to a froth flotation treatment in the presence of a phosphate depressant, said depressant being alkyl phosphonic acids including alkyl diphosphonic acids such as hydroxyethylidene diphosphonic acid, and a carbonate mineral collector reagent, said collector being a fatty acid or mixtures thereof; removing the carbonate mineral overflow so obtained by froth flotation; and recovering the phosphate value in the underflow product of said flotation process. The process can be performed either prior to or after the conventional flotation separation treatment for removing siliceous mineral contaminants from the phosphate mineral by methods known to the art.

5 Claims, No Sheets Drawing,

10 Pages Specification

The file of this unexamined application may be inspected and copies thereof may be purchased (849 O.G. 1221, Apr. 9, 1968).